Oct. 27, 1970     D. R. SENA     3,535,788

NAVIGATIONAL INSTRUMENT

Filed June 25, 1968

INVENTOR
DOMINIC RICHARD SENA

BY Le Blanc & Shur

ATTORNEYS

United States Patent Office 3,535,788
Patented Oct. 27, 1970

1

3,535,788
NAVIGATIONAL INSTRUMENT
Dominic Richard Sena, 6201 Riviera Drive,
Coral Gables, Fla. 33164
Filed June 25, 1968, Ser. No. 739,790
Int. Cl. G01c 21/20
U.S. Cl. 33—1
10 Claims

ABSTRACT OF THE DISCLOSURE

The navigational instrument comprises a flat base having a semicircular portion and a handle. A pair of semicircular scales are concentrically arranged about a face of the semicircular base portion and are graduated to provide 180° on each scale with each scale reading the reciprocal of the other scale. A pointer is pivotally mounted at the center of the scales. An arrow is formed on one end of the pointer and indicates the graduations on the outer scale while simultaneously blocking the graduations on the inner scale from view. In one embodiment, the pointer is opaque, and a window is provided through the pointer to overlie the inner scale graduations, the area of the pointer about the window blocking the outer scale graduations from view. In another form, the pointer is transparent. Opaque indicators are provided on opposite sides of the pivotal axis of the pointer to designate the respective outer and inner scales while the reciprocal and adjacent inner and outer scales are blocked from view whereby only the one true course is designated.

BACKGROUND AND SUMMARY OF THE PRESENT INVENTION

The present invention relates to a navigational instrument and particularly relates to a navigational aid for determining a true course heading from a course line plotted on a chart or the like.

A large number of navigational instruments for determining true course headings on charts have heretofore been proposed and constructed. Many of these devices are somewhat mechanically complicated, bulky, expensive, and inconvenient to use and accordingly have not been generally employed. One commonly used device for determining a true course heading from a course line plotted on a chart is the parallel ruler. This comprises a pair of straight edges connected together by a pair of parallel equal length links. To use this device, one of the edges is aligned with the plotted course, and the device is moved across the chart by alternately fixing one edge and moving the other relative to the first edge until one of the edges is aligned with the compass rose on the chart. The true course heading would then be taken from the compass rose. This is a rather time-consuming, laborious, and indirect method of determining a true course from a plotted course.

The present invention provides a navigational instrument or aid for determining a true course from a plotted course which minimizes the above discussed and other short-comings of prior navigational devices of this type and provides various advantages in construction, mode of operation and result over such prior instruments. Generally, this is accomplished by providing a flat base formed preferably of sheet material, to provide a substantially semicircular configuration and having an integrally extending coplanar handle. The semicircular base carries a pair of semicircular scales arranged concentrically thereon and graduated to provide 180° on each scale. The graduations of one scale provide the reciprocal graduations of the other scale and this affords full course readings from 0 to 360 degrees in a manner as will presently become clear. This feature also provides a compactness

2 of instrument heretofore unavailable in instruments of this type and permits the present instrument to be formed of a size and bulk readily receivable within the pocket of a user.

To determine a true course heading employing the concentrically arranged, reciprocally graduated scales and to avoid error in reading one scale when the other scale should be read, the present invention provides a unique indicating device comprising an elongated pointer pivotally mounted intermediate its ends at a point coincident with the center of the semicircular scales. One end of the pointer is formed in the shape of an arrow and designates the graduations on the outer scale. In one form hereof, the pointer is formed of an opaque material and an aperture or window is formed through the pointer arm on the other side of the pointer pivot from the arrow-shaped end thereof and at a radius to overlie the graduations on the inner scale. An arrow may be formed in the window to precisely designate the course on the inner scale. The opaque material of the pointer arms adjacent the arrow-shaped end and the window thus overlies the inner and outer scales respectively blocking the same from view when one or the other of the arms overlies the scales whereby only the true course heading will be designated. In another form hereof, the pointer and base are formed of a transparent material. The arrow-shaped end designates, as before, the graduations on the outer scale and an opaque portion is formed on the arrow-shaped end to overlie the inner scale graduations. An opaque portion is also formed on the other arm of the pointer, preferably in the shape of an arrow, to designate the inner scale graduations and overlie the outer scale graduations. Thus, when the arrow-shaped end of the pointer denotes the course heading, the opaque portion on one or the other of the arms of the pointer, which overlies the scale carrying face of the instrument, designates the true course heading on the associated scale and overlies and blocks from view the reciprocal scale graduations whereby the wrong course cannot be read.

Accordingly, it is a primary object of the present invention to provide an improved navigational aid for determining a true course heading from a course line plotted on a chart.

It is another object of the present invention to provide an improved navigational instrument for determining a course which instrument provides concentric reciprocally graduated scales and wherein only the true course heading is obtained from the scales.

It is still another object of the present invention to provide an improved navigational aid for determining a true course heading from a course line plotted on a chart which aid provides concentric reciprocally graduated scales and wherein the inappropriate scale is blocked from view. It is a related object of the present invention to provide a navigational instrument which is light weight, compact, pocket size and economical to manufacture.

It is a further object of the present invention to provide a navigational aid for determining a true course heading from a plotted course on a chart which is simple to operate and handle, and easy to read.

These and further objects and advantages of the present invention will become more apparent upon reference to the following specification, claims, and appended drawings wherein:

DETAILED DESCRIPTION OF THE PRESENT INVENTION

Figure 1:
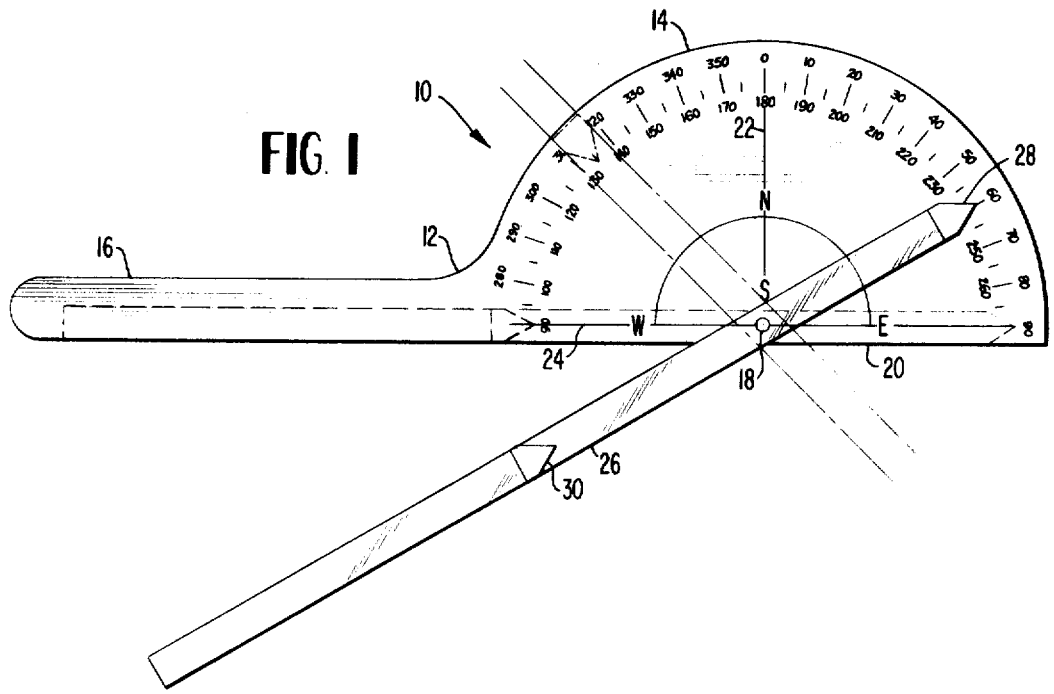
FIG. 1 is a plan view of a navigational instrument constructed in accordance with the present invention.

Referring to the drawings and particularly to FIG. 1, there is shown a navigational instrument or aid generally indicated at 10 comprising a flat body or base 12 formed to provide a substantially semicircular portion 14 having a narrow elongated integrally extending handle 16 projecting therefrom. The center of the semicircular end portion is indicated at 18 and the lower straight edge 20 of the instrument, as seen in FIG. 1, defines a chord line spaced slightly outwardly of the center 18. The lower edge of handle 16 forms a straight line continuation of the lower edge 20 of the arcuate end portion of the instrument and provides a ruler edge which may be employed to align the instrument on the chart as will presently be set forth.

The substantially semicircular end portion of the instrument carries a pair of concentric semicircular scales which are graduated to provide 180° on each scale. The graduations on either scale provide the reciprocal graduations of the other scale. A pair of perpendicular scribe lines 22 and 24 are provided on the face of the instrument with line 24 extending through center 18 parallel to edge 20. Preferably, the outer scale is numerically graduated from 270° at the left hand end of line 24 as seen in FIG. 1, to 360° or zero degrees at the upper end of line 22 and from zero to 90° throughout the next quadrant terminating at the opposite end of line 24 at 90°. The inner scale is graduated from 90° to 270° and it will be seen that the numerical graduations on a common radius are the reciprocal of one another and therefore read 180° apart.

A pointer 26 is pivotally mounted to base 12 at the center of the scales by any suitable means such as a pin or rivet, not shown. An arrow 28 is formed at one end of one arm at pointer 26 and the distance or radius of arrow 28 from the pivotal axis 18 of pointer 26 is such that arrow 28 overlies the graduations on the inner scale with the point of arm 28 designating the outer scale. The opposite arm of pointer 26 is elongated, and when the pointer is disposed in the dashed line position, illustrated in FIG. 1, the elongated arm is disposed in overlying registry with handle 16.

In the form illustrated in FIG. 1, pointer 26 may be formed of a transparent material such as Lucite, Plexiglas, or the like. It will be seen that there is no difficulty in reading the outer scale when the arrow-shaped end 28 of pointer 26 overlies the semicircular end portion 14 of the instrument. In order to read the graduations on the inner scale when pointer 26 points in a direction such that the arrow-shaped end 28 lies off the scales, i.e., when the elongated arm overlies the scales, an opaque area 30, preferably in the form of an arrow, is provided on the elongated pointer arm at a radius from center 18 as to designate the graduations on the inner scale. It is a particular feature hereof that when one or the other of the arms of pointer 26 overlies the scales, the incorrect scale or the scale which would provide the wrong course heading is blocked from view. To this end, the arrow-shaped opaque area 30 is formed to overlie the outer scale graduations while designating the inner scale graduations and an opaque area 31 is provided on the arrow-shaped end 28 to overlie the inner scale graduations. Thus, when one or the other of the pointer arms overlies the scales, the incorrect scale is blocked from view by the associated opaque area while simultaneously the graduations on the appropriate scale are designated. Preferably, the base 12 is also formed of a similar transparent material as the pointer 26 such that scribe lines 22 and 24 may be readily aligned with meridian or latitude lines, respectively, on a chart in a manner as will presently be described.

Figure 2:
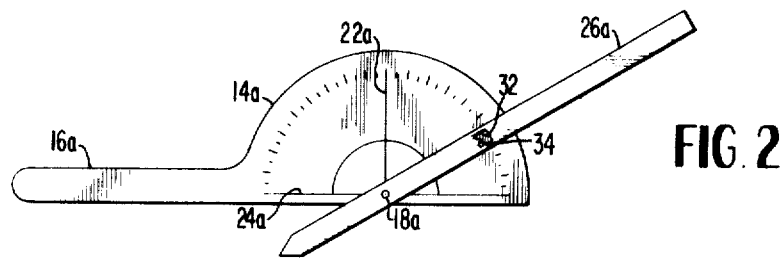
FIG. 2 is a plan view of another embodiment of the navigational instrument hereof and illustrated on a reduced scale.

In FIG. 2, the navigational instrument is similarly formed and arranged as in the previous embodiment but is formed of an opaque material such as sheet metal or wood, plastic laminated cardboard or the like. It will be seen that the arrow-shaped end 28a of pointer 26a overlies the inner scale graduations and directly designates the graduations on the outer scale. To read the inner scale when pointer 26a lies off the scales, i.e., when the elongated arm overlies the scales, an aperture or window 32 is formed through the elongated end of the pointer 26a at a radius from center 18a such that only the graduations on the inner scale appear through window 32. In other words, the opaque pointer 26a blocks the graduations on the outer scale from view when window 32 overlies the inner scale. The opening 32 may be provided with an arrow 34 to indicate the precise graduation.

Figure 3:
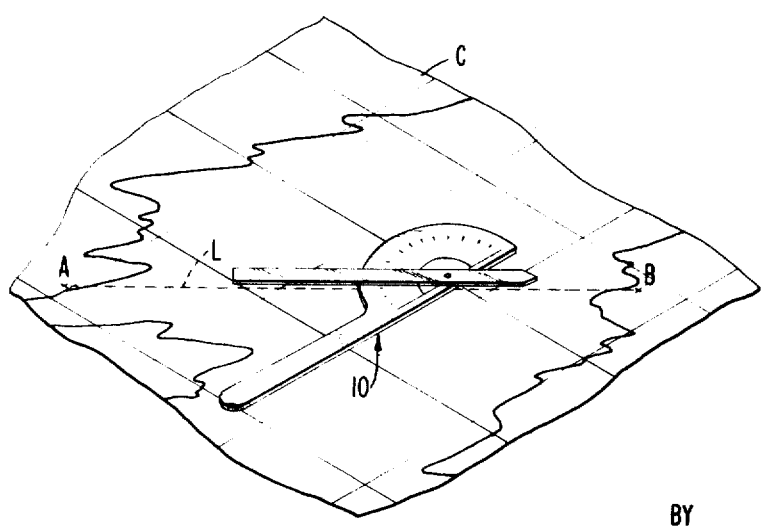
FIG. 3 is a perspective view of the navigational instrument hereof illustrating the manner in which it is located on a chart and a course determined.

In use, and referring now to FIG. 3, a course line L would be laid out on a chart C, between points A and B, for example. To determine the true course, the instrument 10 is placed on the chart with pointer 26 paralleling the course line L and pointing in the direction of the desired heading. To provide a frame of reference, the base 12 is aligned so that scribe line 22 is parallel to a meridian on the chart, or lower edge 20 is parallel to a latitude line. When the instrument is formed of a transparent material, the scribe line 24 can be laid parallel to or overlie a latitude line to provide the frame of reference. In this manner, it will be seen that the outer scale graduations correspond to a compass rose which has been transposed on the chart adjacent the course line L such that a true course heading can be read directly from the outer scale, when the arrow-shaped end 28 overlies the scales. When the pointed end 28 lies off the scales and the elongated arm overlies the scales, the inner scale designates the course heading. Since the inner scale graduations are the reciprocal of the outer scale graduations, a true course heading can be read directly from the inner scale without extrapolation.

It is a significant feature of the present invention that the true course direction is always directly readable from one or the other of the scales and that it is virtually impossible to read the wrong scale. To this end and in either of the forms hereof illustrated in FIGS. 1 and 2, the arrow-shaped end 28 overlies the inner scale blocking the graduations thereon from view whenever end 28 overlies base 14. When the arrow 28 lies off the scales and in the form illustrated in FIG. 1, the opaque arrow-shaped portion 30 of the elongated pointer arm overlies the outer scale, blocking its graduations from view while simultaneously directly designating the graduations on the inner scale. In the form illustrated in FIG. 2 and when arrow-shaped end 28a lies off the scales, the marginal area of the elongated opaque pointer arm lying at a slightly greater radius from center 18a than window 32, blocks the graduations on the outer scale from view and exposes only the inner graduations for viewing through window 32. In this manner, only the correct scale is indicated by the associated arrows with the incorrect scale being blocked from view and this is provided for all pivotal positions of the pointer relative to base 12.

It will be appreciated that by providing concentric scales with the graduations of one scale being the reciprocal of the graduations of the other scale, a reduction in size and material of the instrument is effected. Moreover, this is accomplished without sacrificing accuracy and without requiring any additional operations or extrapolations when reading the scales. In addition, the pointer 26 can be aligned in overlying registry with handle 16 and it will be seen that the instrument is thus compact and available in a pocket size. Most importantly, the present device virtually eliminates the possibility of error in determining a true course heading. With the arrow-shaped end 28 always pointed in the desired heading direction on or adjacent to the plotted course line, the pointer always indicates the true course as only one scale can be read since the reciprocal scale is covered.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalence of the claims are therefore intended to be embraced therein.

What is claimed and desired to be secured by United States Letters Patent is:

1. A device for determining a true course heading from a selected course indicated on a map comprising a flat base having a pair of semicircular scales disposed concentrically thereabout and graduated to provide 180° on each scale, the graduations on one scale providing the reciprocal graduations on the other scale at like circumferential positions, means for aligning the base with a predetermined reference line on the map, and an elongated member pivotally carried by said base at a point coincident with the center of the scales for alignment with the selected course, said member being rotatable in a plane substantially paralleling the plane containing said base, means carried by said member on opposite sides of the pivotal axis thereof for indicating a true course heading on said scales, one of said indicating means being disposed to designate a true course heading on one of the scales, the other indicating means being disposed to designate the true course heading on the other of the scales, means carried by said member on one side of the pivotal axis thereof for blocking one of the scales from view, and means carried by said member on the other side of the pivotal axis thereof for blocking the other of the scales from view.

2. A course determining device according to claim 1 wherein said member is opaque with said one indicating means including an opening formed through said member to expose the associated scale to view through said opening.

3. A course determining device according to claim 1 wherein said member is opaque, said one indicating means including an opening formed through said member at a radial position to expose the associated scale to view through said opening, the graduations of the other scale being blocked from view by marginal portions of said member about said opening.

4. A course determining device according to claim 3 wherein the other indicating means comprises an arrow formed on one end of the member.

5. A course determining device according to claim 4 wherein said opening overlies the innermost scale, said arrow designating the outer scale with the end of the member carrying the arrow overlying the reciprocal graduations on the inner scale and blocking the latter from view.

6. A course determining device according to claim 1 wherein said member is transparent, a portion of said member adjacent said one indicating means being opaque to overlie and block the graduations of the other scale from view.

7. A course determining device according to claim 6 wherein said one indicating means comprises an arrow formed on an end of said member and disposed to designate the outer scale, said opaque portion of said member overlying the reciprocal graduations on said outer scale.

8. A course determining device according to claim 1 wherein said base comprises a semicircular end portion carrying said scales on a face thereof and an elongated handle projecting from said end portion in a like plane therewith.

9. A device for determining a true course heading from a selected course indicated on a map comprising a flat base having a pair of semicircular scales disposed concentrically thereabout and graduated to provide 180° on each scale, the graduations on one scale providing the reciprocal graduations on the other scale at like circumferential positions, means for aligning the base with a predetermined reference line on the map, an elongated member pivotally carried by said base at a point coincident with the center of the scales for alignment with the selected course, said member being rotatable in a plane substantially paralleling the plane containing said base, means carried by said member on opposite sides of the pivotal axis thereof for indicating a true course heading on said scales, one of said indicating means being disposed to designate a true course heading on one of the scales, the other indicating means being disposed to designate a true course heading on the other of the scales, and means carried by said member on one side of the pivotal axis thereof for blocking one of the scales from view.

10. A device for determining a true course heading from a selected course indicated on a map comprising a flat base having a pair of semicircular scales disposed concentrically thereabout and graduated to provide 180° on each scale, numeric indicating means on each of said scales indicating a difference of 180° at each like circumferential position about said scales, means for aligning the base with a predetermined reference line on the map, an elongated member pivotally carried by said base at a point coincident with the center of the scales for aligning with the selected course, said member being rotatable in a plane substantially paralleling the plane containing said base, means carried by said member on opposite sides of the pivotal axis thereof for indicating a true course heading on said scales, one of said indicating means being disposed to designate a true course heading on one of the scales and the other indicating means being disposed to designate a true course heading on the other of the scales.

References Cited

UNITED STATES PATENTS

| 1,243,343 | 10/1917 | Roberts | 33—75 |
| 1,985,907 | 1/1935 | Weems. | |
| 2,685,739 | 8/1954 | Cole. | |
| 3,229,372 | 1/1966 | Quashnock et al. | 33—75 |
| 3,303,568 | 2/1967 | Geiger | 33—75 |

WILLIAM D. MARTIN, Jr., Primary Examiner

U.S. Cl. X.R.

33—75